(12) United States Patent
Prior

(10) Patent No.: US 12,329,998 B2
(45) Date of Patent: Jun. 17, 2025

(54) PASSIVE FIRE PROTECTION DEVICE

(71) Applicant: BOSS Products (Australia) Pty Ltd, Taren Point (AU)

(72) Inventor: Mark Prior, Taren Point (AU)

(73) Assignee: BOSS PRODUCTS (AUSTRALIA) PTY LTD, Taren Point (AU)

( * ) Notice: Subject to any disclaimer, the term of this patent is extended or adjusted under 35 U.S.C. 154(b) by 0 days.

(21) Appl. No.: 17/895,505

(22) Filed: Aug. 25, 2022

(65) Prior Publication Data

US 2023/0067729 A1    Mar. 2, 2023

(30) Foreign Application Priority Data

Aug. 25, 2021  (AU) ................ 2021221808

(51) Int. Cl.
*A62C 2/06* (2006.01)
*F16L 5/04* (2006.01)

(52) U.S. Cl.
CPC .............. *A62C 2/065* (2013.01); *F16L 5/04* (2013.01)

(58) Field of Classification Search
CPC .......... H02G 3/0412; H02G 3/22; E04B 1/94; E04B 1/947
USPC ...................................... 52/220.8
See application file for complete search history.

(56) References Cited

U.S. PATENT DOCUMENTS

| | | | | |
|---|---|---|---|---|
| 6,305,133 | B1 * | 10/2001 | Cornwall | F16L 5/04 |
| | | | | 52/220.8 |
| 11,209,083 | B2 * | 12/2021 | Gandolfo | F16L 5/10 |
| 2015/0047276 | A1 * | 2/2015 | Gandolfo | H02G 3/22 |
| | | | | 52/220.8 |
| 2017/0354836 | A1 * | 12/2017 | Lopes | H02G 3/22 |
| 2018/0142810 | A1 * | 5/2018 | Vandertook | F16L 55/0336 |
| 2018/0264298 | A1 * | 9/2018 | Lopes | E04B 1/94 |
| 2019/0219170 | A1 * | 7/2019 | Gandolfo | F16J 15/022 |

FOREIGN PATENT DOCUMENTS

| | | | | |
|---|---|---|---|---|
| CA | 2921157 | A1 * | 2/2015 | .............. E04B 5/48 |
| JP | 2006234140 | A | 9/2006 | |
| KR | 102239032 | B1 | 4/2021 | |
| WO | WO-2016186486 | A1 * | 11/2016 | ............. A62C 2/065 |

OTHER PUBLICATIONS

Search Report cited in British patent application No. GB2212356.6; Feb. 16, 2023; 3 pp.

* cited by examiner

*Primary Examiner* — Brian E Glessner
*Assistant Examiner* — Adam G Barlow
(74) *Attorney, Agent, or Firm* — LEMPIA SUMMERFIELD KATZ LLC

(57) ABSTRACT

A firestop has a housing with a first tubular part that defines a first longitudinal end of the housing, and a second tubular part that defines a second longitudinal end of the housing. A passageway extends between the first and second longitudinal ends, is defined by at least the first and second tubular parts. When the firestop is installed in a building, the service components are to extend through the passageway. The firestop has a mating interconnection between the first and second tubular parts that permits the length of the housing between the first and second longitudinal ends to be adjustable between a maximum length and a minimum length. Intumescent material is supported by the housing and that swells in response to heat. The intumescent material being arranged to swell in response to heat in at least an inward direction.

20 Claims, 13 Drawing Sheets

PASSIVE FIRE PROTECTION DEVICE

CROSS REFERENCE TO RELATED APPLICATION

The present application claims priority of Australian Patent Application No. 2021221808 filed on Aug. 25, 2021, the entire contents of which is incorporated herein for all purposes by this reference.

FIELD OF THE INVENTION

The present invention relates to a device for providing passive fire protection. In particular, the present invention relates to a fire collar.

BACKGROUND

To slow or prevent the spread of fire and smoke within a building, it is known to compartmentalize the building into smaller regions. This is, in part, achieved through the use of fire-resistant walls, floors, soffits, and doors that enclose the various compartments. However, various services (such as fluid pipes, data and electrical cables, and HVAC ducts) must extend through structures of the building that divide the building into the compartments. These services can compromise the fire/smoke containment of a compartment.

By way of example only, components of services may need to extend through a wall that separates two adjacent compartments. In some instances, the service components are installed after a wall has been erected within a building. For example, a hole-saw is used to form circular holes in the wall materials, and the service components are passed through the wall materials. To then reinstate the fire-resistant barrier, a fire collar is fitted around the service component, and secured against the external surface of the wall. Known fire collars have at least a sleeve with intumescent material supported on the internal face of the sleeve. Mounting tabs may be provided on the sleeve for securing the fire collar to the wall.

In most cases, it is necessary to provide resistance to fire on both sides of the wall, and thus two fire collars are required, one to each side of the wall. Achieving adequate fire resistance can be difficult where access to one side of the wall is not available, or difficult.

There is a need to address the above, and/or at least provide a useful alternative.

SUMMARY

There is provided a firestop for one or more service components, the firestop comprising:
a housing having:
  a first tubular part that defines a first longitudinal end of the housing,
  a second tubular part that defines a second longitudinal end of the housing,
  a passageway that extends between the first and second longitudinal ends, and that is defined by at least the first and second tubular parts, whereby when the firestop is installed in a building, the service components are to extend through the passageway, and
  a mating interconnection between the first and second tubular parts that permits the length of the housing between the first and second longitudinal ends to be adjustable between a maximum length and a minimum length; and
intumescent material that is supported by the housing and that swells in response to heat, the intumescent material being arranged into at least:
  a first portion that is supported by the first tubular part, and is disposed at the first longitudinal end to swell in response to heat in at least an inward direction with respect to the first portion, and
  a second portion that is supported by the second tubular part, and is disposed at the second longitudinal end to swell in response to heat in at least an inward direction with respect to the second portion.

In at least some embodiments, the first tubular part has a first inner end portion at the opposing end of the first tubular part to the first longitudinal end, and
the second tubular part has a second inner end portion at the opposing end of the second tubular part to the second longitudinal end,
wherein the mating interconnection is configured such that the second inner end portion is shaped to be received within the first inner end portion,
and wherein the part of the second inner end portion that is internally of the first inner end portion increases as the length of the housing between the first and second longitudinal ends decreases.

Preferably, the mating interconnection is arranged to constrain the relative positions of the first and second tubular parts at each length of the housing. In at least some forms, the mating interconnection includes:
  one or more guide formations in one part of the housing, and
  one or more follower formations in another part of the housing,
  wherein each follower formation locates in a respective guide formation to thereby constrain the relative positions of the first and second tubular parts at each length of the housing.

In some examples, the mating interconnection is arranged to inhibit the first and second tubular parts from relative rotation at each length of the housing. The guide formations can be parallel with the longitudinal direction of the housing.

In some alternative examples, the mating interconnection is arranged to inhibit the first and second tubular parts from relative longitudinal displacement at each length of the housing. The guide formations can extend spiroidally with respect to the housing.

Each guide formations can be one of a slot or channel that is formed in the respective part of the housing. Each follower formation can include a projection that is locatable in a respective guide formation. In some forms, each follower can be a detent formed in the housing that is shaped to be locatable within the guide formations. In some alternative forms, each follower formation can be a separate component that is attached to the housing, and includes a shank portion that is locatable in a respective guide formation. Each follower formation can be in the form of a screw fastener that extends through the slot, and can be tightened to fix the mating interconnection at desired length.

In some embodiments, the firestop further comprises one or more mounting formations that are associated with the housing, and wherein in installation of the firestop the mounting formation facilitates attaching the firestop to a building with an opening within which the firestop is located.

The mounting formations can include one or more mounting flanges that are connected to the housing, each mounting flange having one or more mounting points for use in mounting the firestop to the building. In some forms, the mounting flanges extend generally transversely with respect to the longitudinal direction of the firestop. Preferably, the mounting flanges project transversely outwardly with respect to the passageway.

In some alternative forms, the mounting flanges extend generally parallel with the longitudinal direction of the firestop. Preferably, the mounting flanges project longitudinally outwardly with respect to the passageway.

In some examples, the mounting formations are provided at one of the first or second longitudinal ends of the housing. In some other examples, the mounting formations are provided at both first and second longitudinal ends of the housing.

The mounting formation is in the form of an annular ring that is securable about the housing, the annular ring having a radially extending mounting flange.

In certain embodiments, the passageway has a generally circular cross section in the direction that perpendicular to the longitudinal direction.

In some alternative embodiments, the passageway has a generally quadrilateral cross section in the direction that perpendicular to the longitudinal direction.

Each of the first and second portions of intumescent material can have a generally annular form in their unswollen state to thereby define an inner aperture through which to pass the service components.

Alternatively, each of the first and second portions of intumescent material can be sheets that are disposed at the respective first and second longitudinal ends of the housing.

The firestop can further comprise dividers that extend across the first and second longitudinal ends. Preferably, the dividers are arranged in one or more sets of bristles that project at least partially across the respective longitudinal end, with slits being defined between the individual bristles. In some examples, each of the first and second portions are arranged in two sets of bristles, with the bristles of the two sets overlapping one another. Preferably, the bristles within each set of bristles are arranged to extend in a direction that is generally orthogonally to the upper panel and/or lower panel.

There is also provided a method of forming a barrier with fire-resistance within a building that has an opening in a structure through which one service components are to extend, the method involving:

providing a firestop as previously described,
adjusting the length of the firestop such that the first and second longitudinal ends of the housing have a separation that is determined relative to the thickness of the structure, and
installing the firestop within the opening and at a desired position with the first and second longitudinal ends at predetermined positions relative to at least one of the external faces of the structure,
wherein the service components extend through, or are able to be passed through, the passageway.

The method can also involve restraining the firestop at the desired position.

In some examples, restraining the firestop can involve installing fasteners in mounting points of the firestop, and securing the fasteners to the structure. In examples in which the firestop has mounting flanges, the method can alternatively or additionally involve securing the firestop to the building by affixing the mounting flanges to the building.

In some examples, restraining the firestop can alternatively or additionally involve securing one or more mounting formations about the housing, such that when firestop is at the desired position each mounting formation abuts the structure and inhibits movement of the firestop through the opening in one direction.

The method can alternatively or additionally involve applying a curable material to at least one of the housing of the firestop and the structure within or around the opening, and
allowing the curable material to cure and thereby restrain the firestop at the desired position.

In some examples, the opening is shaped to provide an interference fit with the firestop, and the method further involves pressing the firestop into the opening to the desired position.

BRIEF DESCRIPTION OF THE DRAWINGS

In order that the invention may be more easily understood, embodiments will now be described, by way of example only, with reference to the accompanying drawings, in which.

DETAILED DESCRIPTION

Figure 1:
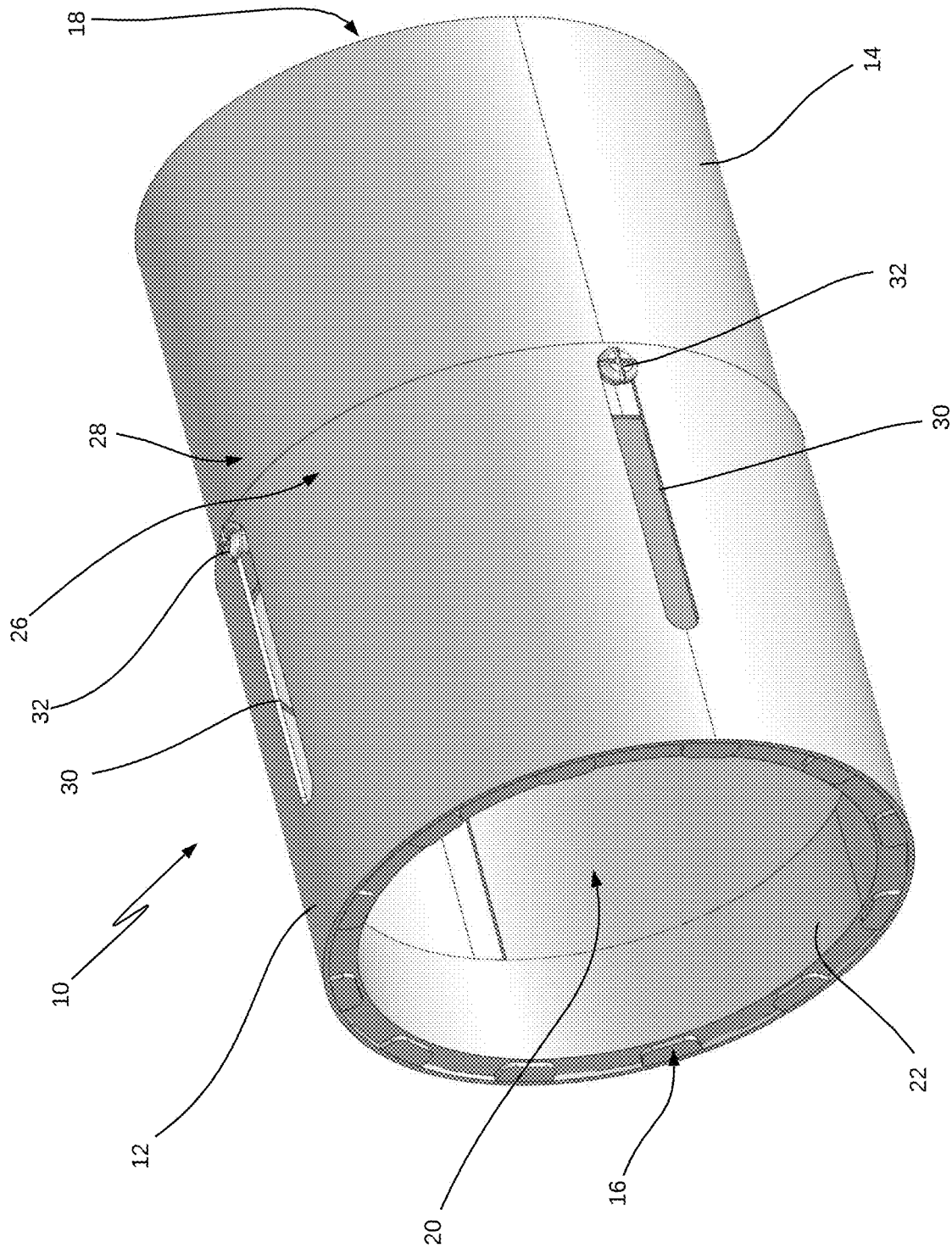
FIG. 1: is a perspective view of a firestop according to a first embodiment.

FIGS. 1 to 5 show a firestop 10 according to first embodiment. The firestop 10 has a housing, which in this embodiment has a first tubular part 12, and a second tubular part 14. The first tubular part 12 defines a first longitudinal end 16 of the housing, and the second tubular part 14 defines a second longitudinal end 18 of the housing.

The housing has a passageway 20 that extends between the first and second longitudinal ends 16, 18. In this example, the passageway 20 is defined by the first and second tubular parts 12, 14 alone. When the firestop 10 is installed in a building, service components (not shown) are to extend through the passageway 20.

Intumescent material is supported by the housing. As is known in this art, intumescent material is typically a blended material, a component of which swells in response to heat.

Figure 3:
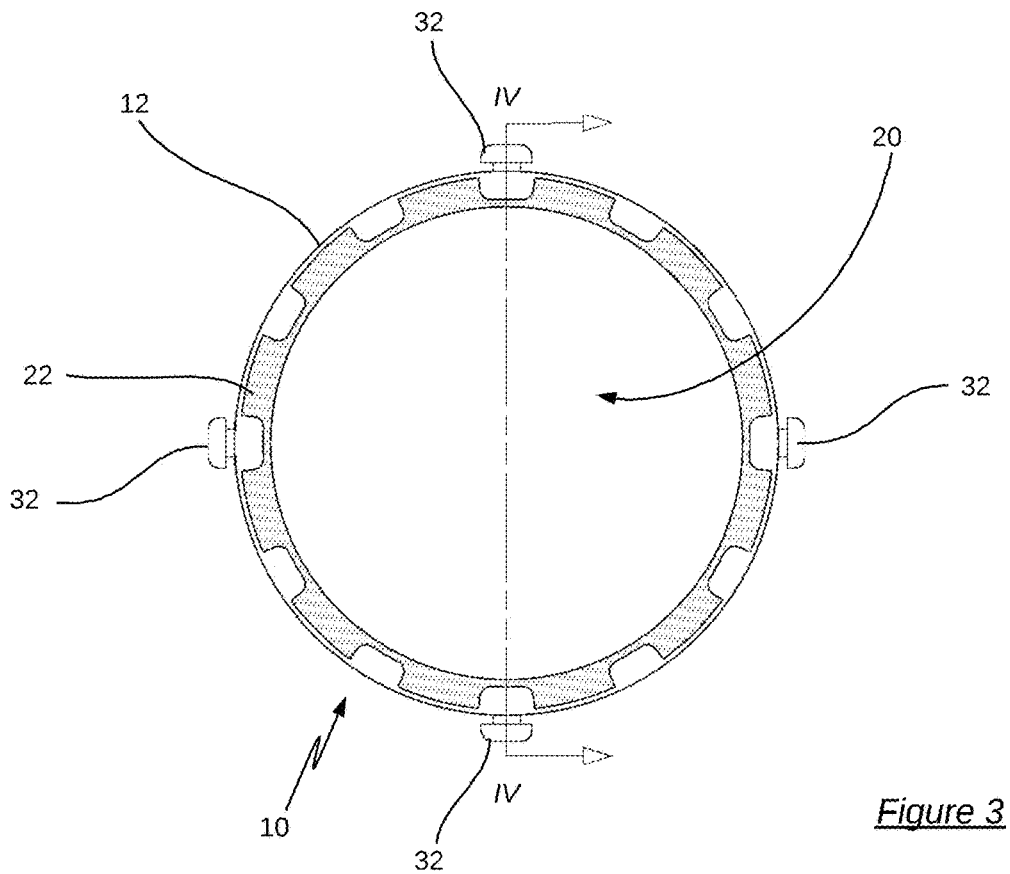
FIG. 3: is an end view of the firestop of FIG. 1.
Figure 4:
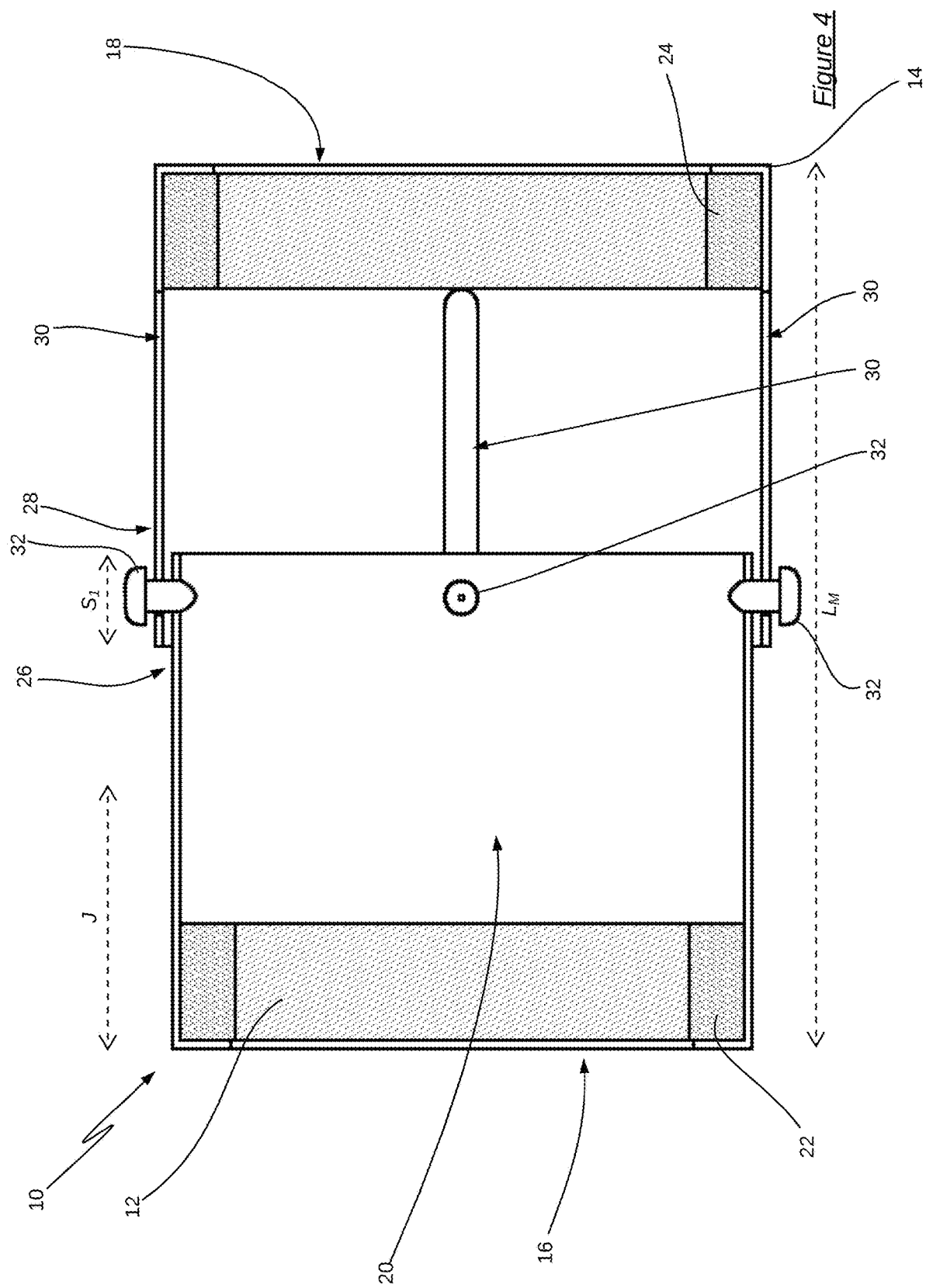
FIG. 4: is a vertical cross section of the firestop as viewed along the line IV-IV in FIG. 3.

In this way, heat generated by a fire causes the intumescent material to swell. With appropriately selected and positioned intumescent material, encloses the cavity within the passageway 20 and surrounding the service components. In this example, the intumescent material is arranged into a first portion 22 and a second portion 24. The first portion 22 is supported by the first tubular part 12 at the first longitudinal end 16, as shown in FIGS. 1, 3 and 4. The second portion 24 is supported by the second tubular part 14 at the second longitudinal end 18, as shown in FIG. 4.

Each of the first and second portions 22, 24 is of generally annular form in its unswollen state to thereby define an inner aperture through which to pass the service components. However, when each of the first and second portion 22, 24 is exposed to heat, the material swells radially inwardly from that respective portion 22, 24. In this way, the diameter of the inner aperture reduces as the material swells. With sufficient swelling, the first and second portions 22, 24 close gaps between the housing and the service components, and thereby facilitate establishing a fire-resistant barrier.

Figure 2:
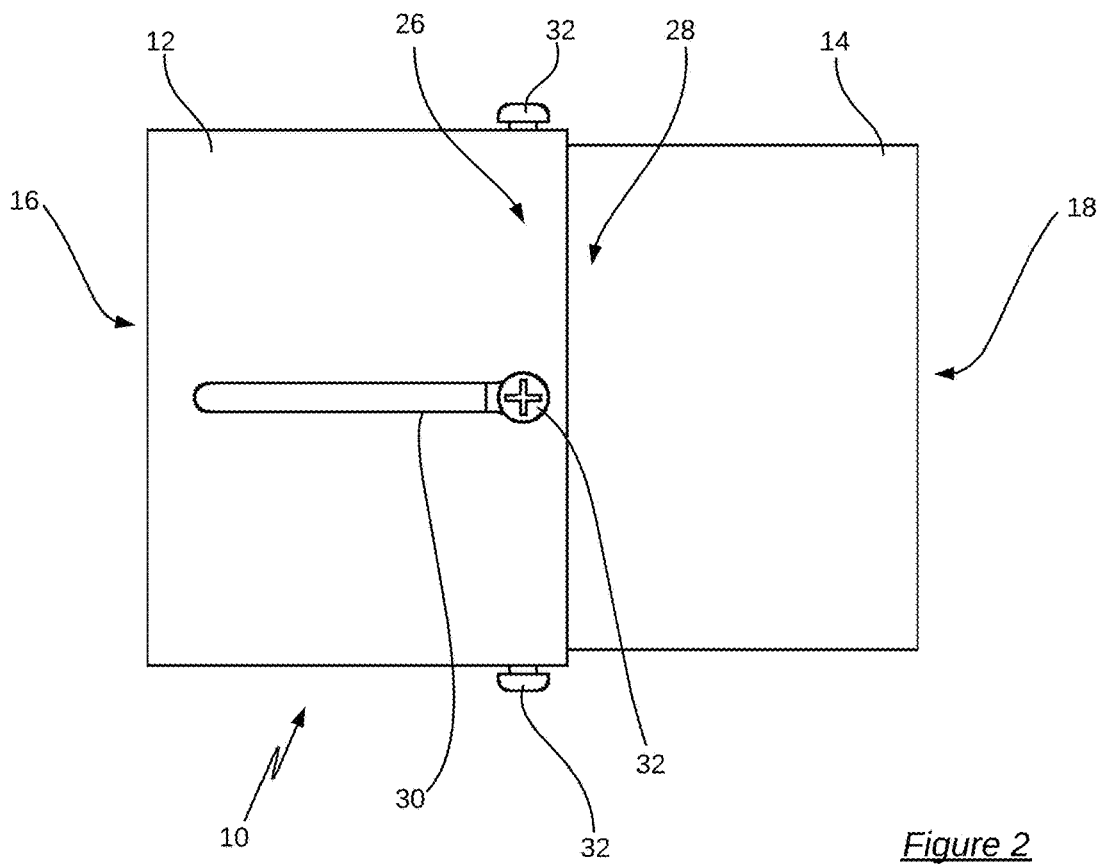
FIG. 2: is a side view of the firestop of FIG. 1.
Figure 5:
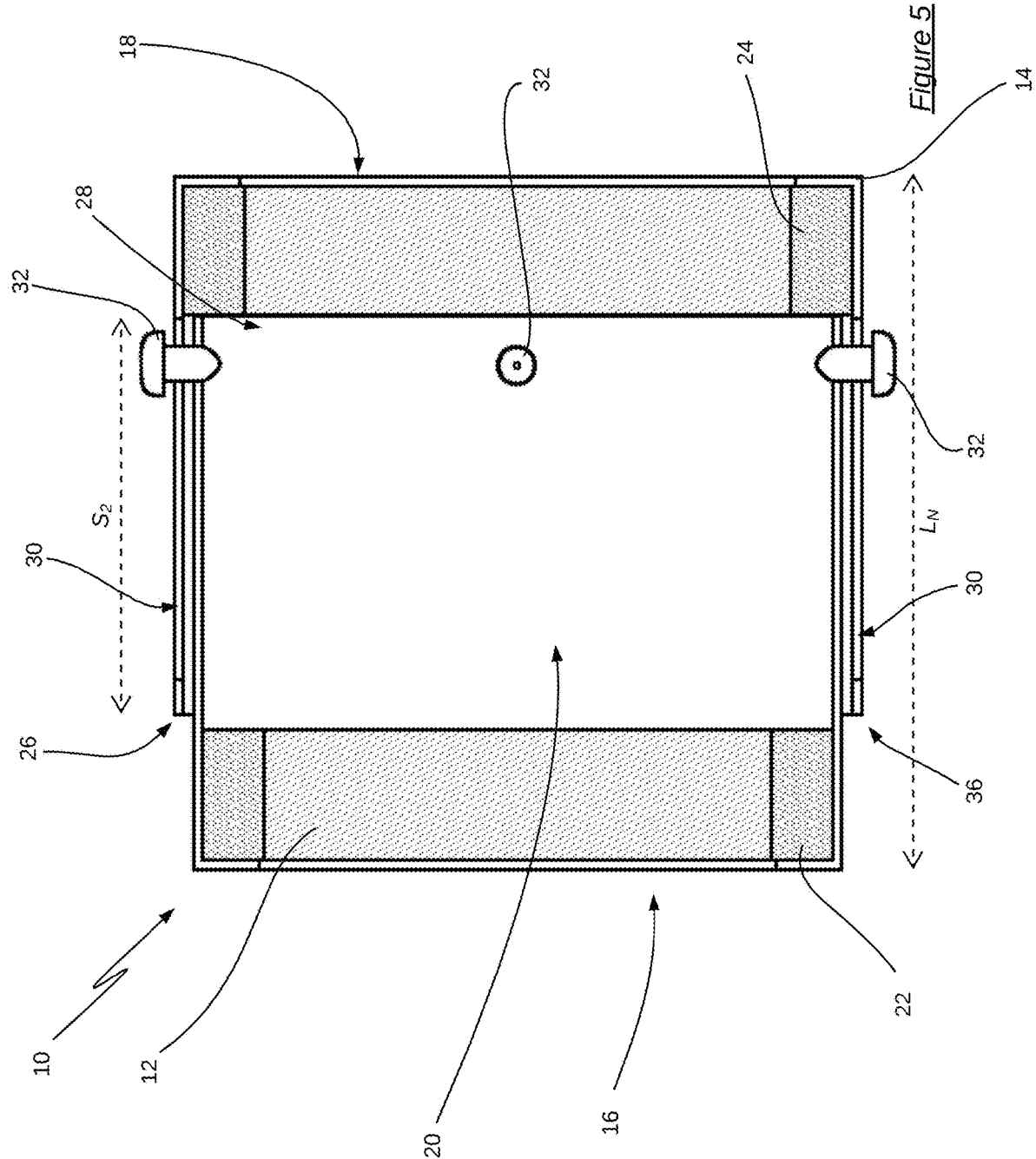
FIG. 5: is cross section of the firestop as illustrated in FIG. 4, at its minimum longitudinal length.

The firestop 10 has a mating interconnection between the first tubular part 12 and the second tubular part 14 that permits the length of the housing between the first and second longitudinal ends 16, 18 to be adjustable between a maximum length and a minimum length. FIGS. 1, 2 and 4 illustrate the firestop 10 at its maximum length (indicated in FIG. 4 by double-headed arrow LM). FIG. 5 illustrates the firestop 10 at is minimum length (indicated in FIG. 5 by double-headed arrow LN). FIG. 4 also indicates the adjustment length with double-headed arrow J.

The first tubular part 12 has a first inner end portion 26, which is at the opposing end of the first tubular part 12 to the first longitudinal end 16. Similarly, the second tubular part 14 has a second inner end portion 28, which is at the opposing end of the second tubular part 14 to the second longitudinal end 18. The mating interconnection of the housing is configured such that the second inner end portion 28 is shaped to be received within the first inner end portion 26. In other words, the outer surface of the second inner end portion 28 has the same cross-sectional shape as the inner surface of the first inner end portion 26, but is dimensionally slightly smaller. In this way, the second inner end portion 28 can be positioned within the first inner end portion 26.

The part of the second inner end portion 28 that is internally of the first inner end portion 26 increases as the length of the housing between the first and second longitudinal ends 16, 18 decreases. FIG. 4 indicates the length of the part of the second inner end portion 28 that is internally of the first inner end portion 26 with double-headed arrow $S_1$. FIG. 5 indicates the length of the part of the second inner end portion 28 that is internally of the first inner end portion 26 with double-headed arrow $S_2$.

As will be appreciated, the housing is able to "telescope", by adjustment of the relative position of the first and second tubular parts 12, 14 (by adjustment of the insertion length of the second tubular part 14 within the first tubular part 12). Accordingly, the length of the firestop 10 can be adjusted such that the first and second longitudinal ends 16, 18 of the housing have a separation that is determined relative to the thickness of the structure in which the firestop 10 is to be fitted. In this way, the firestop 10 can be installed within an opening in that structure, such that each of the first and second longitudinal ends 16, 18 are at predetermined positions relative to at least one of the external faces of the structure.

Further, as the firestop 10 has the intumescent material at each of the first and second inner end portions 26, 28, the firestop 10 has the capacity to establish fire and smoke protection in the event of there being a fire at either side of the firestop 10.

The mating interconnection of the housing of the firestop 10 is also arranged to constrain the relative positions of the first and second tubular parts 12, 14 at each length of the housing. In this particular example, the mating interconnection includes guide formations in the first tubular part 12, which are in the form of slots 30. The mating interconnection also has follower formations in the second tubular part 14, which are in the form of screw fasteners 32. Each screw fastener 32 is secured in a hole formed in the second inner end portion 28 of the second tubular part 14, and with the shank extending through a respective slot 30 and the first inner end portion 26 captured underneath the head.

The screw fasteners 32 and slots 30 constrain the relative positions of the first and second tubular parts 12, 14 at each length of the housing. As is apparent from FIGS. 1, 2 and 4, the slots 30 are parallel with the longitudinal direction of the firestop 10. In this way, the screw fasteners 32 and slots 30 inhibit the first and second tubular parts 12, 14 from relative rotation. In other words, the first and second tubular parts 12, 14 can only translate relative to one another when adjusting the length of the housing. If desired, the screw fasteners 32 can be tightened to clamp the first tubular part 12 between the heads and the outer surface of the second tubular part 14. Consequently, the mating interconnection can be fixed at a desired length.

Figure 6:
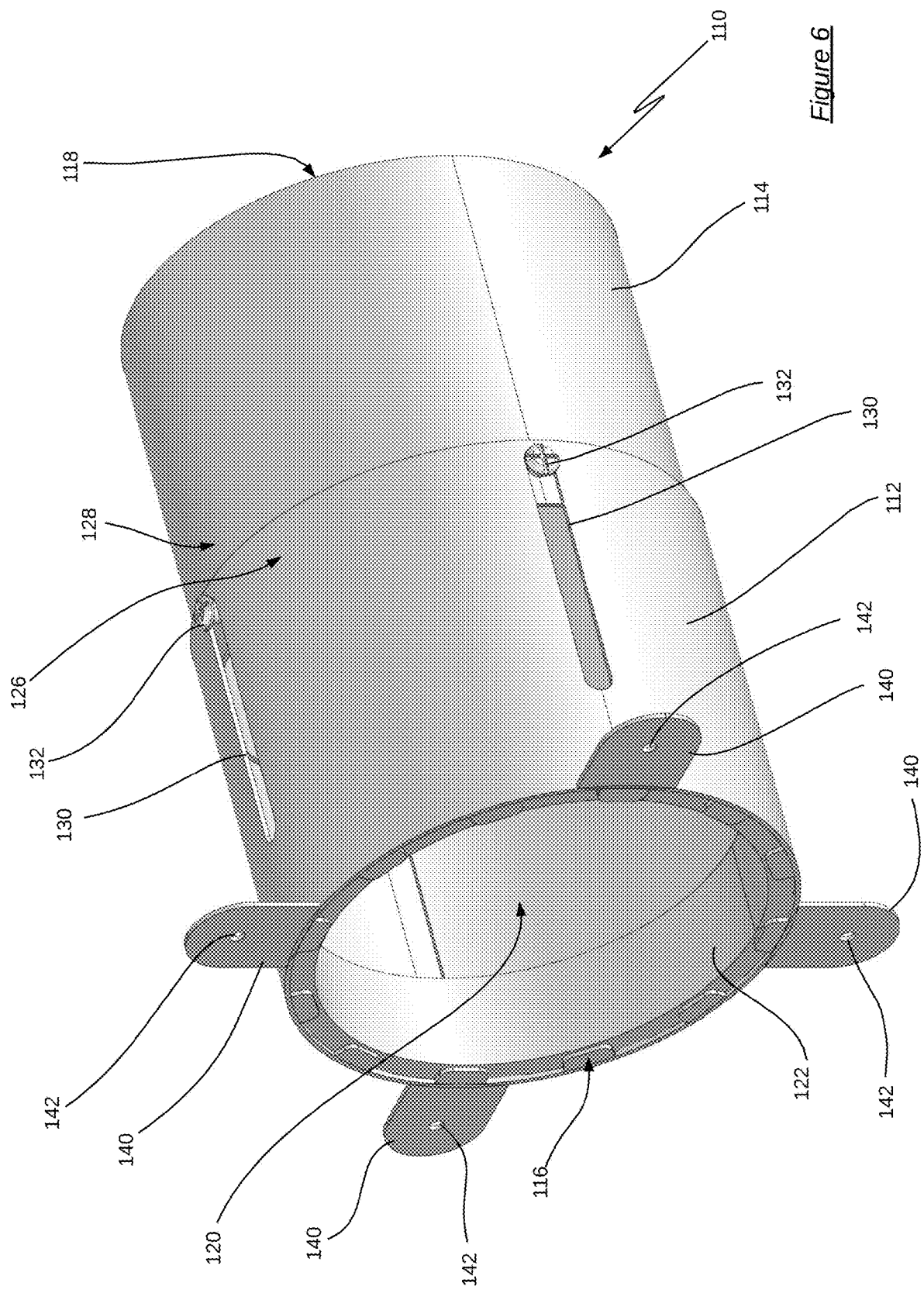
FIG. 6: is a perspective view of a firestop according to a second embodiment.

FIG. 6 shows a firestop 110 according to a second embodiment. Parts of the firestop 110 that are the same or similar to parts of the firestop 10 have the same reference numbers with the prefix "1" and for succinctness, will not be described again.

The firestop 110 differs from the firestop 10 in additionally having mounting flanges 140 are formed on the housing. Each mounting flange 140 has a mounting point for use in mounting the firestop 110 to the building structure. In this example, each mounting point is in the form of a hole 142 in the mounting flange 140.

In installation of the firestop 110, the mounting flanges 140 and mounting holes 142 facilitate attaching the firestop 110 to a building.

The mounting flanges 140 can be formed integrally with the housing (and in this example, with the first tubular part 112). Alternatively, the mounting flanges 140 can be separately formed components that are attached to the housing.

By way of example only, a building may have an internal wall that is to provide a fire-resistant barrier between two compartments of the building. A known wall system for this type of barrier can include a steel frame to which two sets of fire rated plasterboard panels is secured so as to form wall skins on either side of the frame. An opening is formed through the plasterboard panels through which to pass service components. The opening is to have a diameter that is to provide a clearance for the firestop 110.

The length of the firestop 110 is adjusted such that the first and second longitudinal ends 116, 118 of the housing have a separation that is determined relative to the thickness of the wall structure. The firestop 110 is then installed within the opening, at a desired position with the first and second longitudinal ends 116, 118 at predetermined positions relative to at least one of the external faces of the wall structure. To this end, the length may be set so that the separation of the first and second longitudinal ends 116, 118 substantially corresponds with the overall wall thickness. The firestop 110 can then be "posted" into the opening, with the second longitudinal end 118 being inserted first.

Suitable fasteners can then be inserted through the holes 142 in the mounting flanges 140, to secure the firestop 110 to one side of the wall structure. Thus, the firestop 110 will be restrained at the desired position. With the length of the firestop housing set appropriately, the first and second longitudinal ends 116, 118 will be flush with the external faces of the wall structure.

A curable material, such as a fire-rated mastic, can be applied to the housing of the firestop 110, and/or the wall structure within or around the opening. The curable material can be applied prior to, during, and/or after installation of the firestop 110 within the opening. Once cured, the curable material can contribute to restraining the firestop 110 at the desired position. As will be appreciated, such curable material can also contribute to the establishment of the necessary fire-resistance at the barrier.

Figure 7:
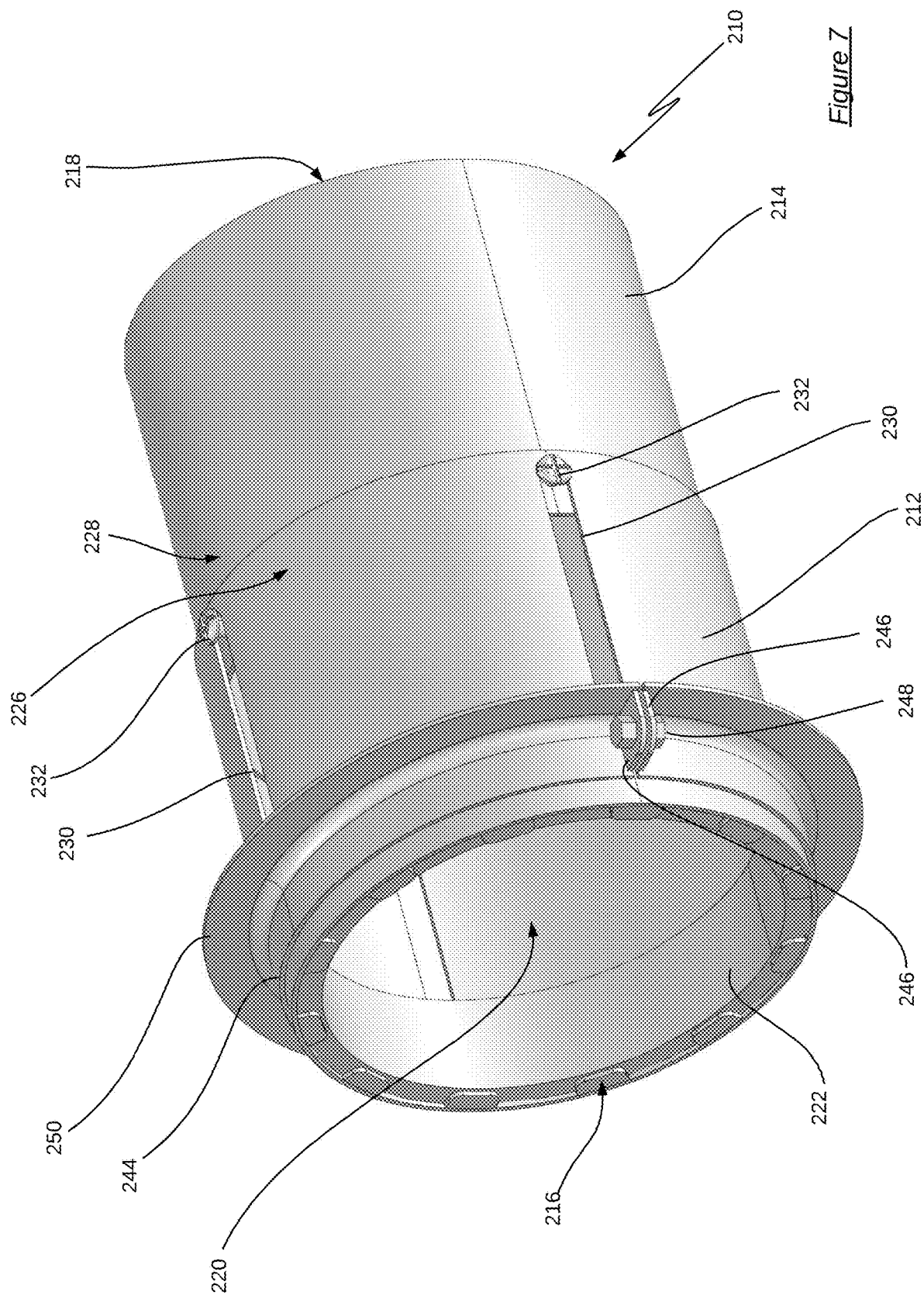
FIG. 7: is a perspective view of a firestop according to a third embodiment.

FIG. 7 shows a firestop 210 according to a third embodiment. Parts of the firestop 110 that are the same or similar to parts of the firestop 10 have the same reference numbers with the prefix "2" and for succinctness, will not be described again.

The firestop 210 differs from the firestop 10 in additionally having a mounting formation is in the form of an annular ring that is formed by a set of segments 244. Each segment 244 has an arcuate shape with two end formations 246. Threaded fasteners 248 (one of which is shown in FIG. 7) extends across the separation between the adjacent segments 244 and joins the two end formations 246 of those adjacent segments 244. By tightening the threaded fasteners 248, the annular ring that is assembled from the segments 244 is securable about the housing, as shown in FIG. 7. Each segment 244 has a radially extending mounting flange 250.

In installation of the firestop 210 in an opening in a wall structure, the annular ring can be used to secure the firestop 210 against a surface of the wall surrounding the opening. To this end, the annular ring can be secured around the housing of the firestop 210 with the radially extending mounting flange 250 in abutment with the wall structure surrounding the opening. The annular ring inhibits movement of the firestop 210 through the opening in one direction. As will be appreciated, installing two annular rings to the housing of the firestop 210 and on opposite sides of the wall structure, the annular rings can capture the wall structure between the two radially extending mounting flanges 250. Thus, the firestop 210 is restrained at the desired position.

A curable material can be applied to the side of the radially extending mounting flange 250 that faces the wall structure, and/or to the wall structure about the opening. Alternatively or additionally, self-drilling fasteners can be used to create holes in the radially extending mounting flange 250, and then in the wall structure surrounding the opening.

FIGS. 8 to 11 shows a firestop 310 according to a fourth embodiment. Parts of the firestop 110 that are the same or similar to parts of the firestop 10 have the same reference numbers with the prefix "3" and for succinctness, will not be described again.

The firestop 310 differs from the firestop 10 in the housing. In particular, the manner of the mating interconnection between the first tubular part 312 and the second tubular part 314.

Figure 8:
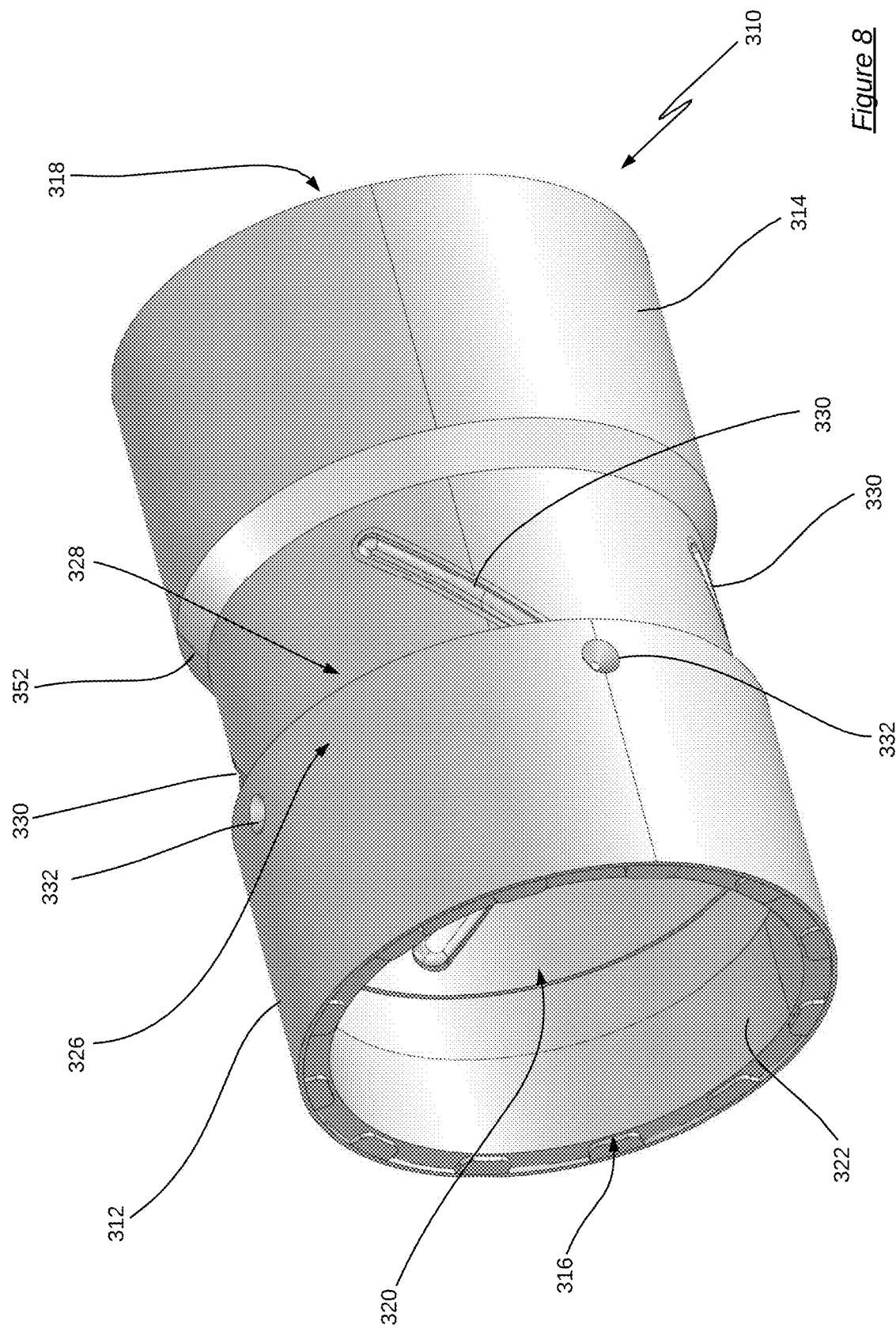
FIG. 8: is a perspective view of a firestop according to a fourth embodiment.
Figure 9:
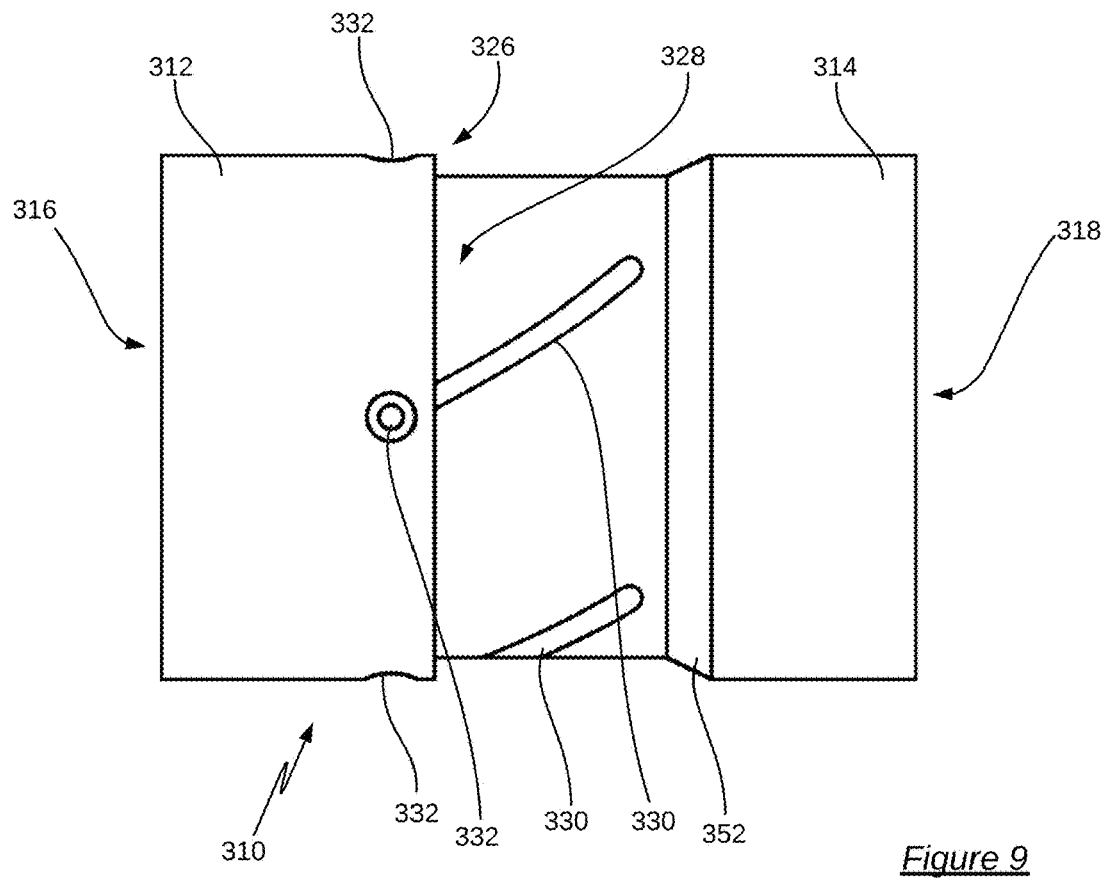
FIG. 9: is a side view of the firestop of FIG. 8.
Figure 10:
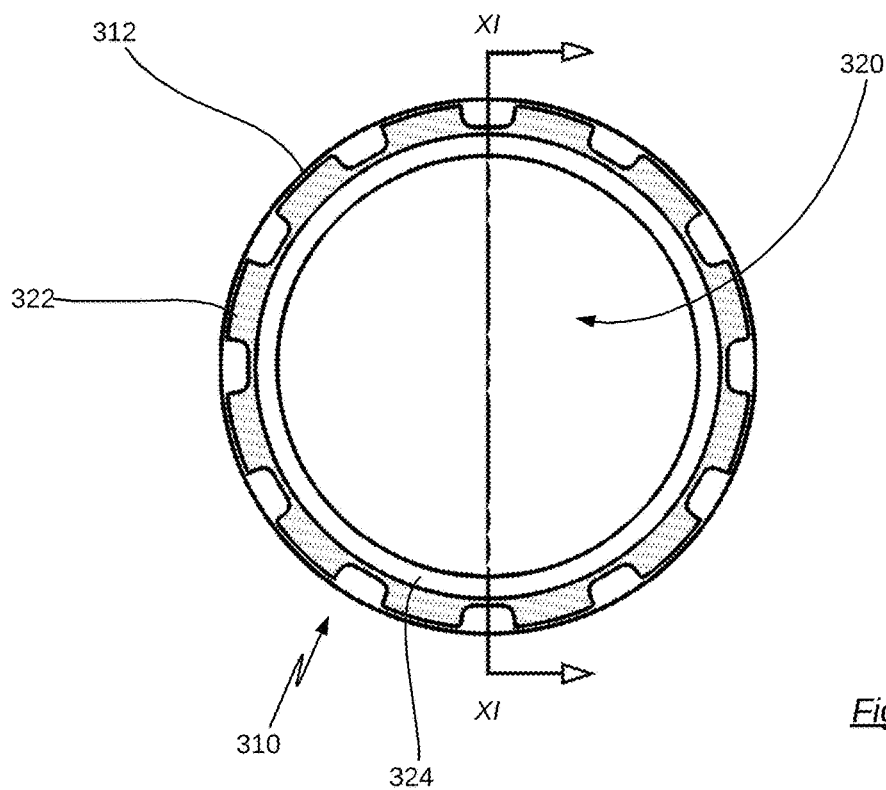
FIG. 10: is an end view of the firestop of FIG. 8.
Figure 11:
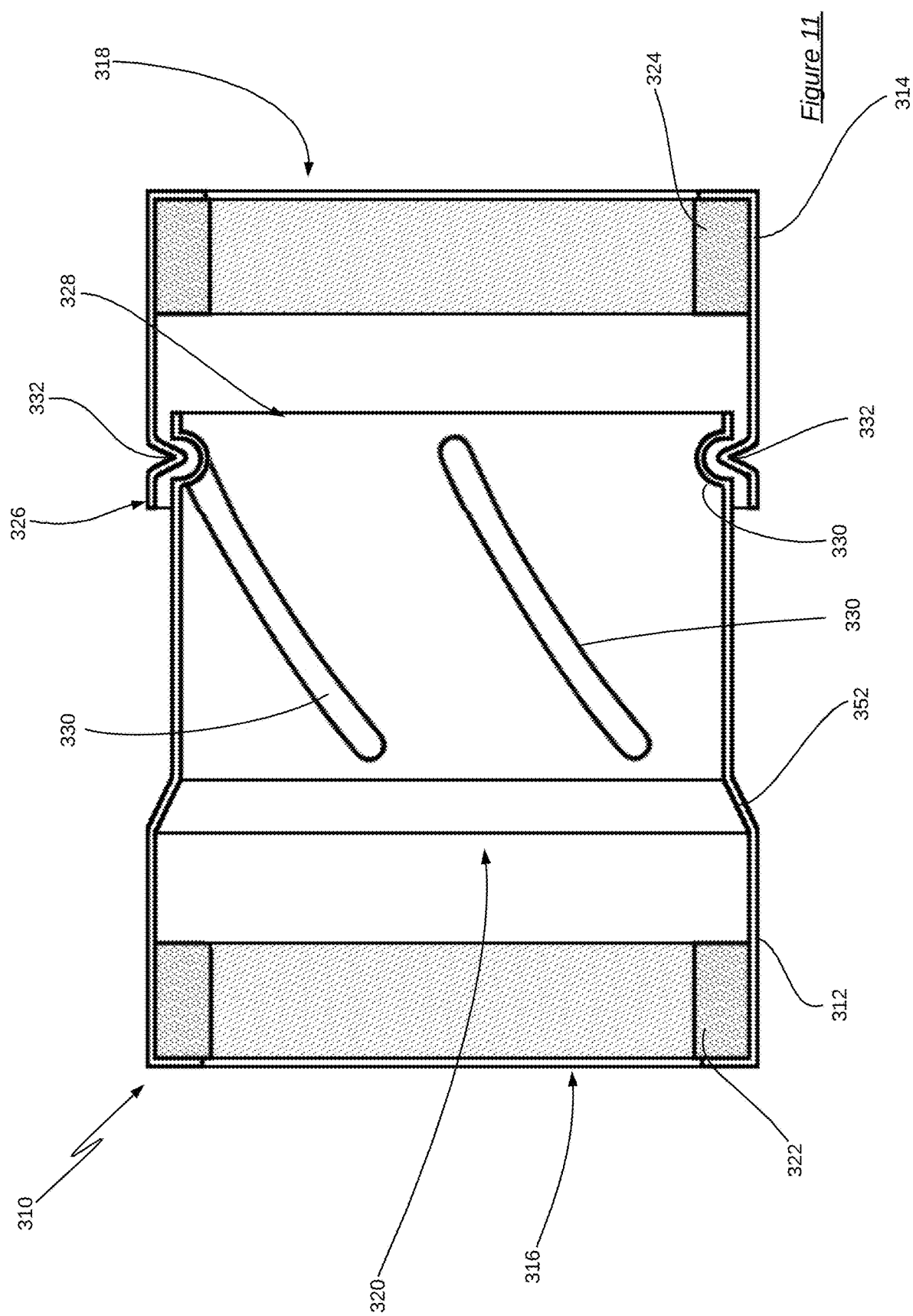
FIG. 11: is a vertical cross section of the firestop as viewed along the line XI-XI in FIG. 10.

As shown in FIGS. 8, 9 and 11, the second inner end portion 328 of the second tubular part 314 has a reduced diameter, relative to the part of the second tubular part 314 that includes the second longitudinal end 318. To this end, the second tubular part 314 includes transition portion 352 that has a conical form.

Further, in this example, the guide formations are formed in the second tubular part 314, and the follower formations are formed in the first tubular part 312. The guide formations are in the form of indented channels 330. Each indented channel 330 extends spiroidally along the second tubular part 314. The follower formations are in the form of detents 332 formed in the first tubular part 312 so as to project inwardly with respect to the passageway 320.

As indicated in FIG. 11, the detents 332 locate respectively within the indented channels 330. In this way, the detents 332 constrain the relative positions of the first and second tubular parts 312, 314 at each length of the housing.

As will be appreciated, in this example, the first and second tubular parts 312, 314 rotate relative to one another as the length of the firestop 310 is adjusted between the maximum and minimum lengths. Further, the pitch of the indented channels 330 can be selected so that friction between the detents 332 and the indented channels 330 resists unintended alteration of the length of the firestop 310. This can be beneficial during installation of the firestop 310 within an opening in a wall structure.

The pitch of guide formations that extend spiroidally along the housing can be selected to achieve a desired increase in length change for relative rotation. Further, the spiroidal shape can be helical, or the pitch may vary along the length of the spiroidal shape.

As will be appreciated from the drawings, the passageways of each of the firestop 10, firestop 110, firestop 210, and firestop 310 are generally circular cross section, in the direction that perpendicular to the longitudinal direction of the respective housing.

FIGS. 12 to 17 show a firestop 410 according to a fifth embodiment. The firestop 410 has a housing, which in this embodiment has a first tubular part 412, and a second tubular part 414. The first tubular part 412 defines a first longitudinal end 416 of the housing, and the second tubular part 414 defines a second longitudinal end 418 of the housing.

The housing has a passageway 420 that extends between the first and second longitudinal ends 416, 418. In this example, the passageway 420 is defined by the first and second tubular parts 412, 414 alone. When the firestop 410 is installed in a building, service components (not shown) are to extend through the passageway 420.

Figure 16:
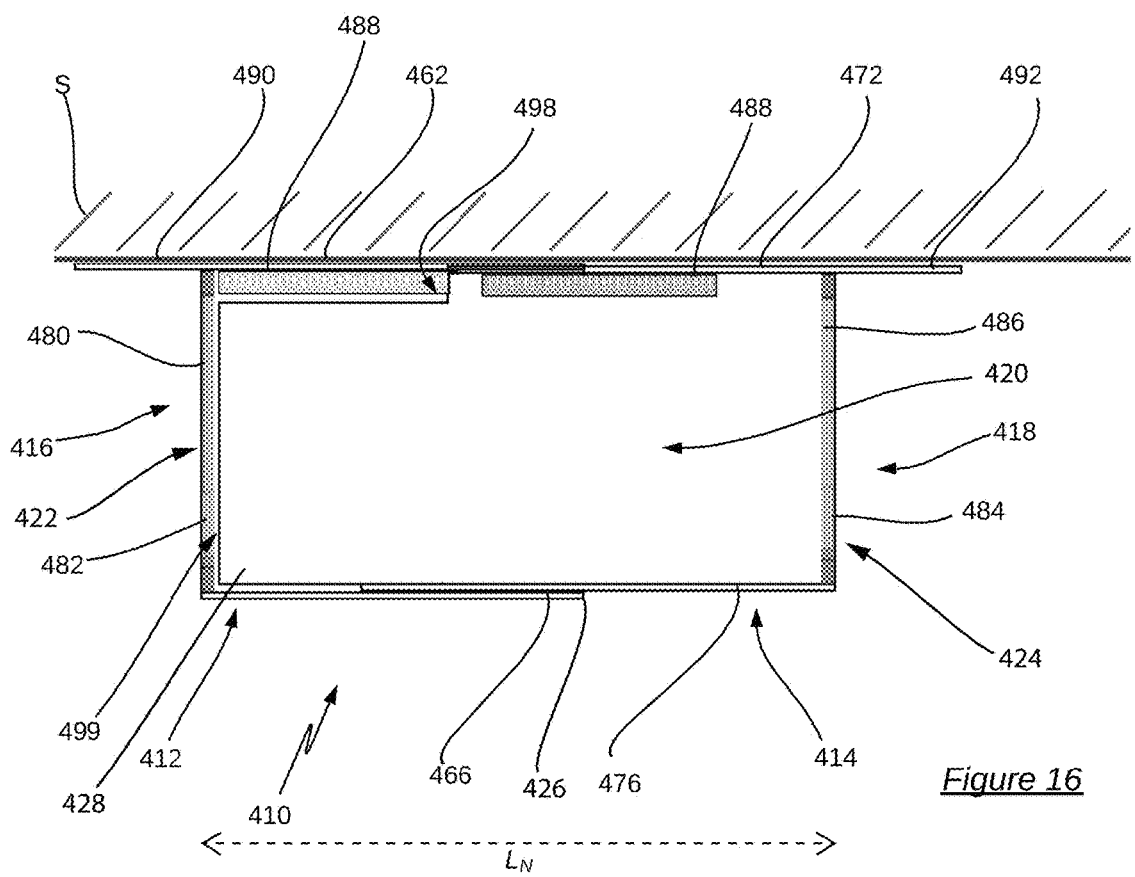
FIG. 16: is cross section of the firestop as illustrated in FIG. 15, at its minimum longitudinal length.
Figure 17:
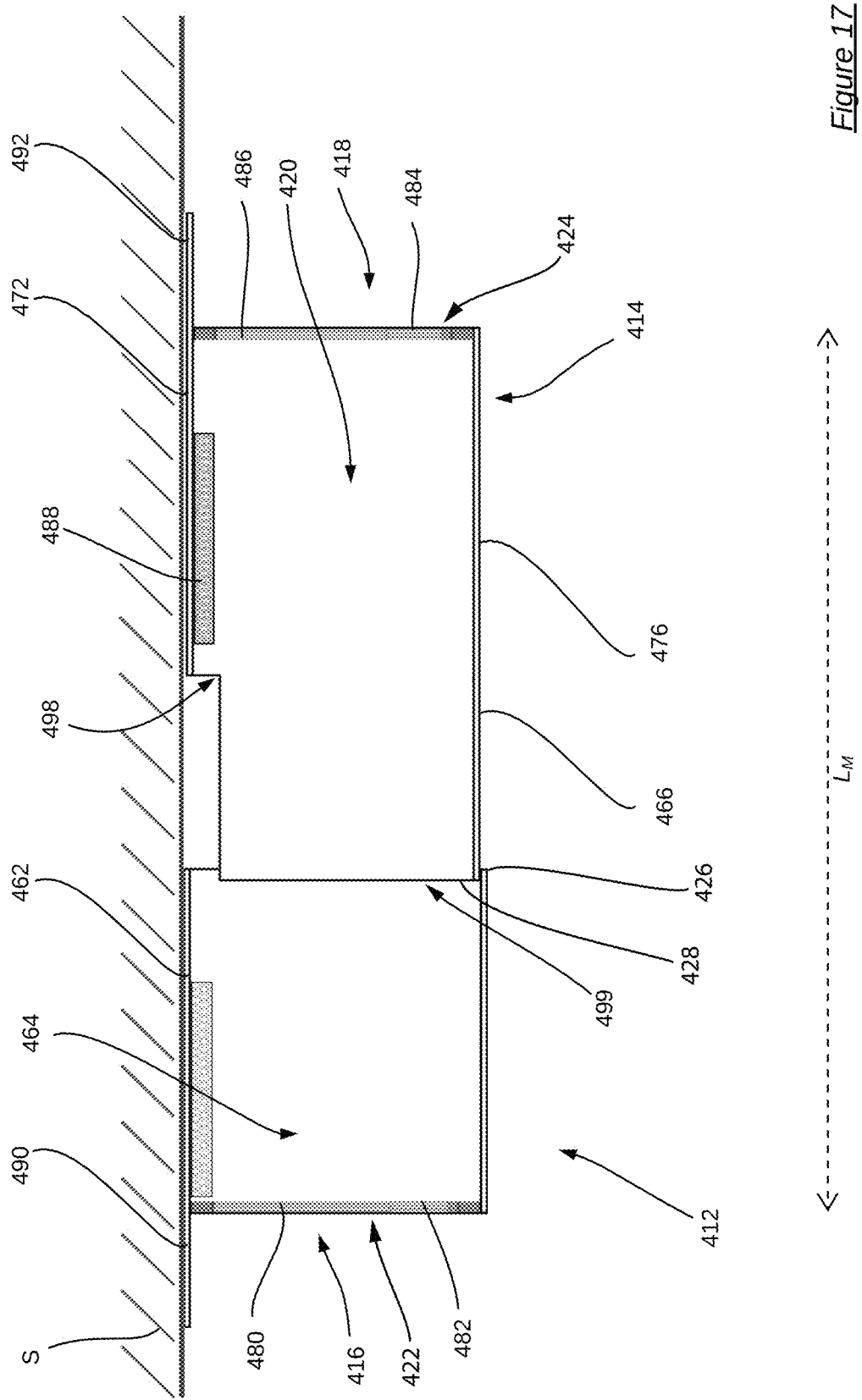
FIG. 17: is cross section of the firestop as illustrated in FIG. 15, at its maximum longitudinal length.

The firestop 410 has a mating interconnection between the first tubular part 412 and the second tubular part 414 that permits the length of the housing between the first and second longitudinal ends 416, 418 to be adjustable between a maximum length and a minimum length. FIG. 16 illustrates the firestop 410 at is minimum length, which is indicated in FIG. 16 by double-headed arrow LN. FIG. 17 illustrates the firestop 410 at its maximum length, which is indicated in FIG. 17 by double-headed arrow LM).

Figure 12:
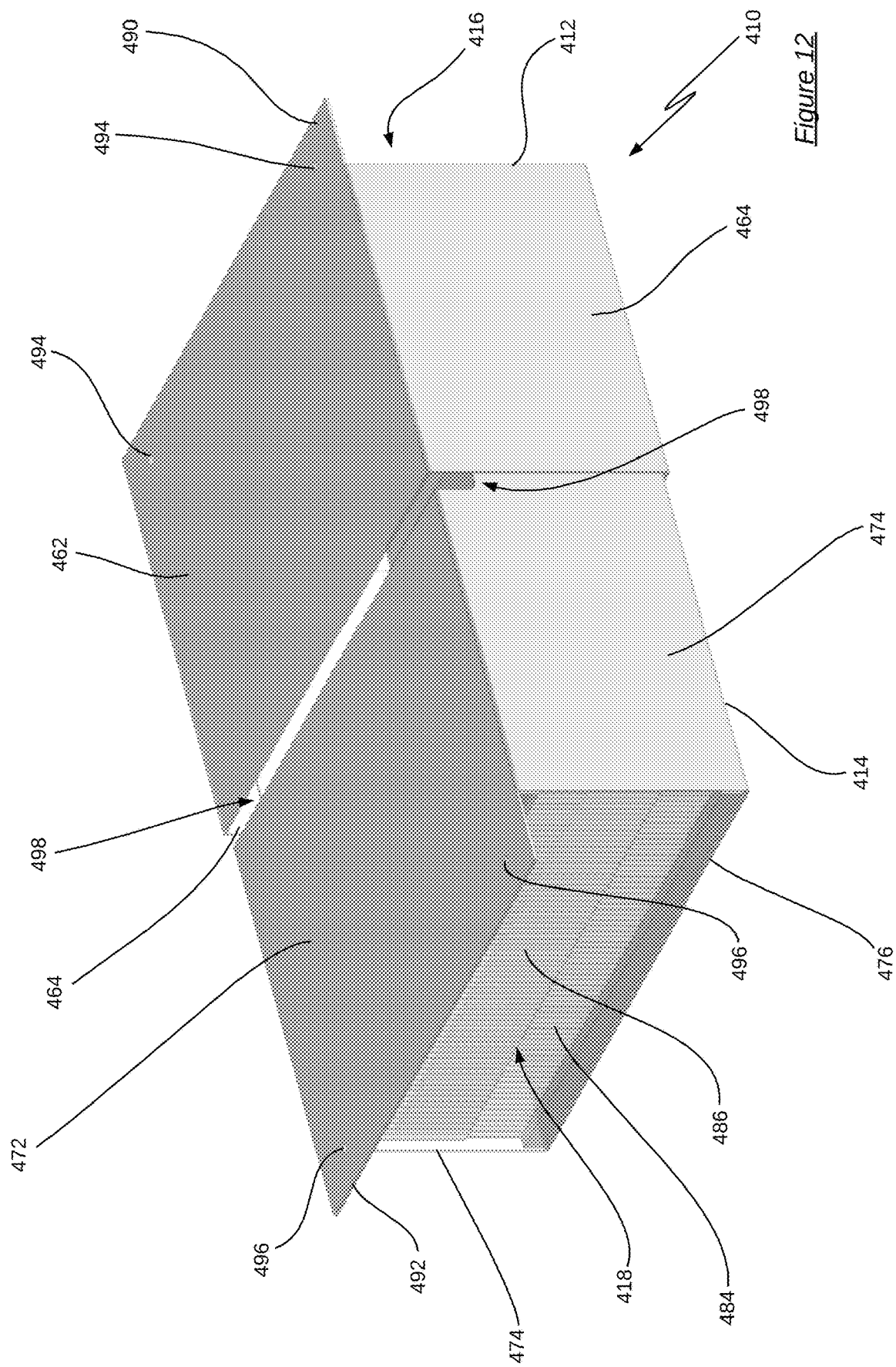
FIG. 12: is a perspective view of a firestop according to a fifth embodiment.
Figure 13:
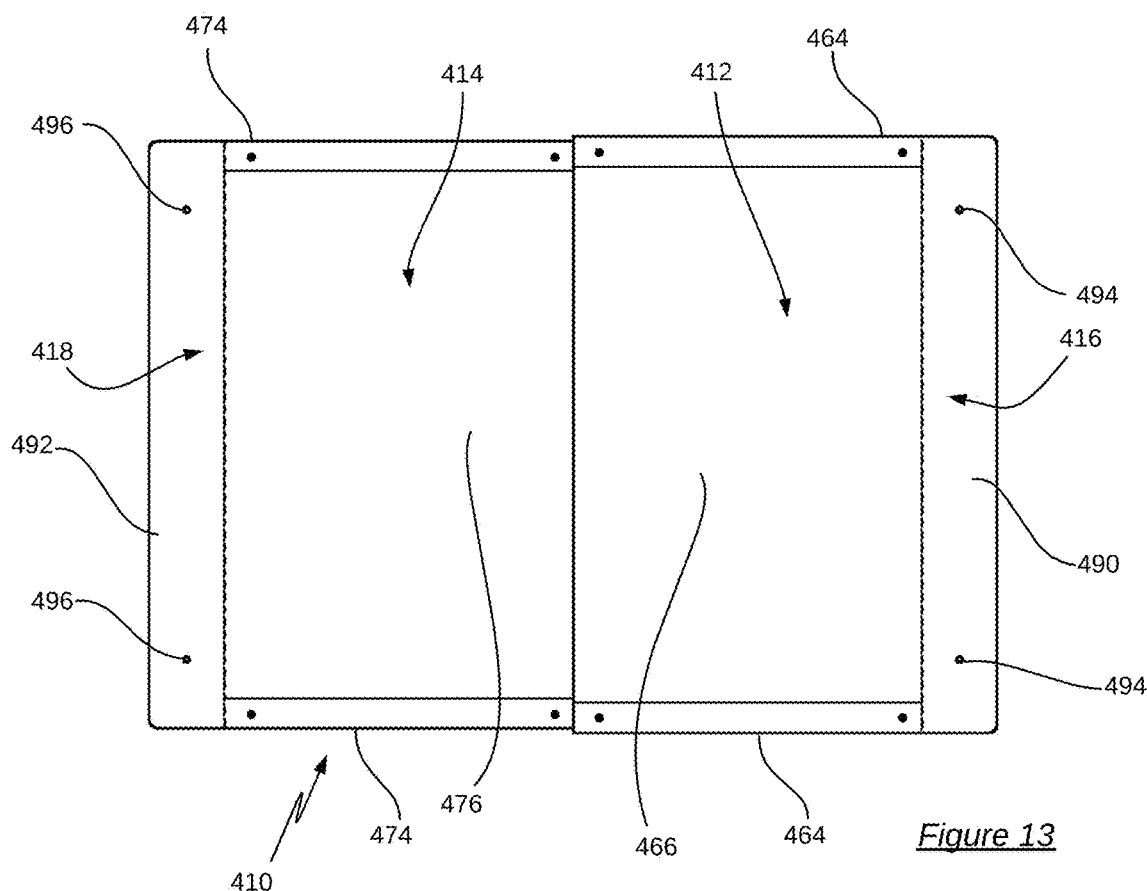
FIG. 13: is a side view of the firestop of FIG. 12.
Figure 14:
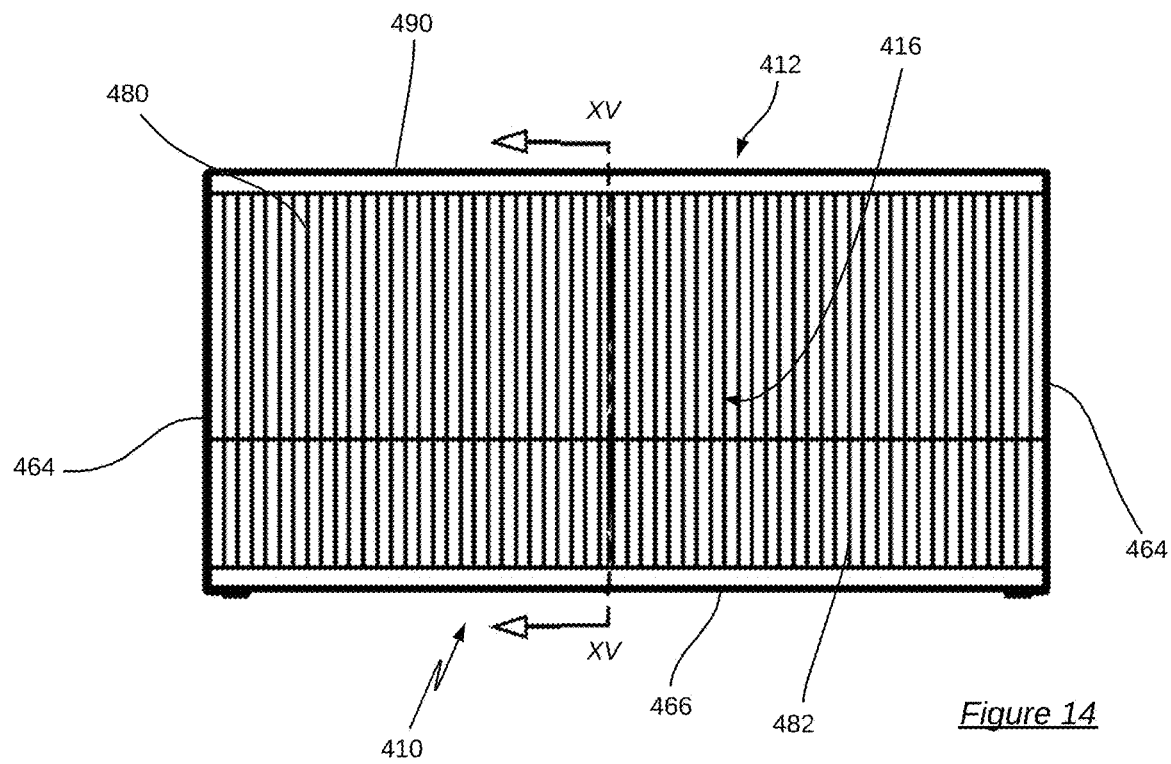
FIG. 14: is an end view of the firestop of FIG. 12.

It will be apparent from FIGS. 12 to 14 that the passageway 420 of the firestop 410 has a generally quadrilateral cross section, in the direction that perpendicular to the longitudinal direction of the housing. To this end, the first tubular part 412 has an upper panel 462, two lateral side walls 464 that are each connected to the upper panel 462, and a lower panel 466. Similarly, the second tubular part 414 has an upper panel 472, two lateral side walls 474 that are each connected to the upper panel 472, and a lower panel 476.

The mating interconnection of the housing is configured such that the second tubular part 414 is shaped to be received within the first tubular part 412. In other words, the outer surface of the second tubular part 414 has the same cross-sectional shape as the inner surface of the first tubular part 412, but is dimensionally slightly smaller. In this way, the second tubular part 414 can be positioned within the first tubular part 412.

In this example, the firestop 410 includes dividers that are arranged into a first portion 422 and a second portion 424. The dividers have a form that is capable of inhibiting passage of smoke. The first portion 422 is arranged at the first longitudinal end 416, and a second portion 424 is arranged at the second longitudinal end 418. The first and second portions 422, 424 are configured for the service components to extend through the passageway 420, whilst surrounding the service components at the respective longitudinal end 416, 418.

In this particular example, the first portion 422 is in the form of two sets of bristles 480, 482. The bristles in each set 480, 482 project partially across the first longitudinal end 416. Further, the two sets of bristles 480, 482 overlap one another. Similarly, the second portion 424 is in the form of two sets of bristles 484, 486. The bristles in each set 484, 486 project partially across the second longitudinal end 418, with the two sets of bristles 484, 486 overlapping one another.

Each set of bristles 480, 482, 484, 486 is mounted within a channel that is secured to the internal surface of the respective tubular part 412, 414. To this end, within the first tubular part 412, the upper set of bristles 480 is secured via its channel to the upper panel 462 at the first longitudinal end 416, and the lower set of bristles 482 is secured via its channel to the lower panel 466 also at the first longitudinal end 416. Similarly, within the second tubular part 414, the upper set of bristles 486 is secured via its channel to the upper panel 472 at the second longitudinal end 418, and the lower set of bristles 484 is secured via its channel to the lower panel 476 at the second longitudinal end 418.

Intumescent material is supported by the housing. As shown schematically in FIGS. 15 to 17, the intumescent material of the firestop 410 includes sheets 488 that are disposed within the passageway 420. The sheets 488 are mounted within the passageway 420 so as to be in abutment with at least the upper panel 462 of the first tubular part 412, and the upper panel 472 of the second tubular part 414. The sheet 488 is typically mounted by brackets formations (not shown).

The first tubular part 412 of the housing also includes a mounting flange 490, and the second tubular part 414 of the housing also includes a mounting flange 492. Both mounting flanges 490, 492 project transversely outwardly with respect to the passageway 420. Mounting flange 490 includes mounting points, in the form of holes 494 for securing the first tubular part 412 to a building. Similarly, mounting flange 492 includes mounting points, in the form of holes 496 for securing the second tubular part 414 to a building.

In this particular example, the mounting flange 490 is parallel with the upper panel 462 of the first tubular part 412, and the mounting flange 492 is parallel with the upper panel 472 of the second tubular part 414. More particularly, the mounting flange 490 is co-planar with the upper panel 462 of the first tubular part 412, and the mounting flange 492 is co-planar with the upper panel 472 of the second tubular part 414. In this way, the firestop 410 is particularly suitable for mounting beneath a soffit S, as indicated in FIGS. 15 to 17.

Figure 15:
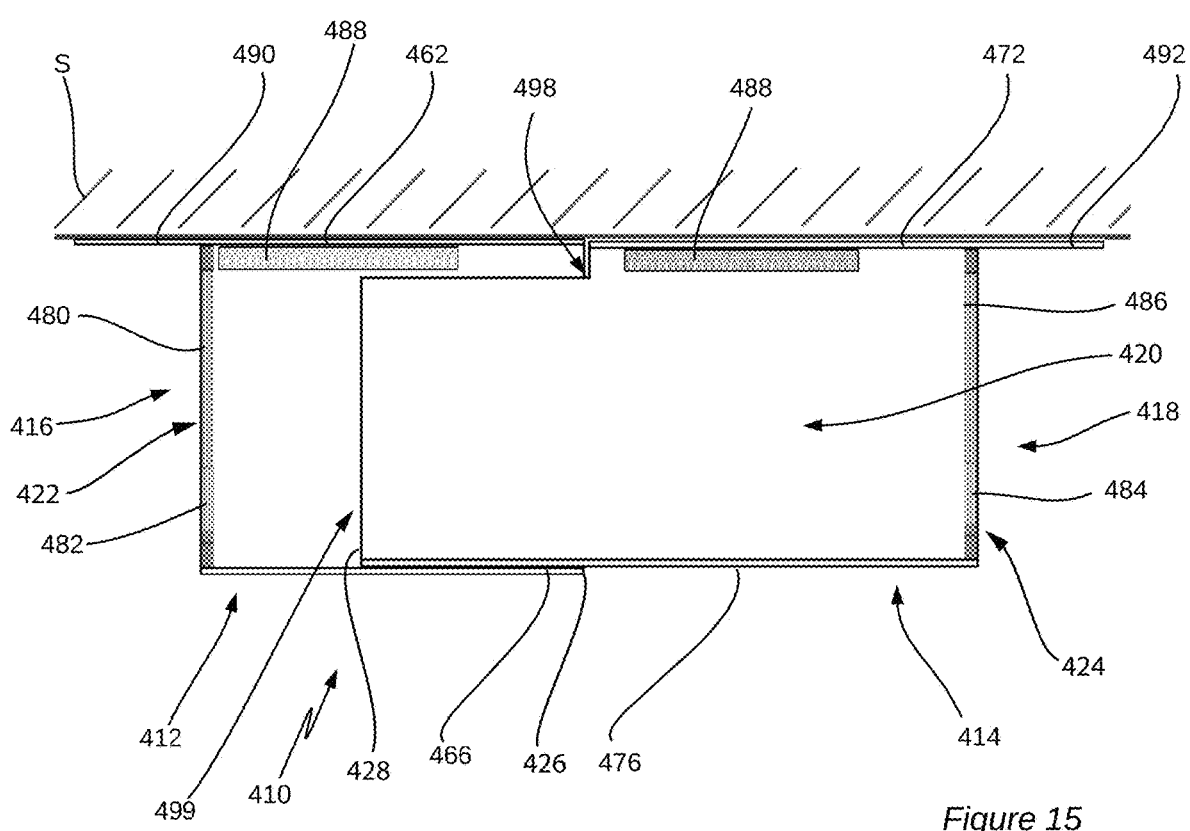
FIG. 15: is a vertical cross section of the firestop as viewed along the line XV-XV in FIG. 14, together with a soffit.

As shown in FIGS. 12, 15 and 16, each of the two lateral side walls 474 in the second tubular part 414 has a step 498. The portion of each side wall 474 that is between the second longitudinal end 418 and the step 498 is taller than the portion of the side wall 474 in the second inner end portion 428. In addition, the upper panel 472 only extends between the second longitudinal end 418 and the step 498. The second tubular part 414 has an insertion end 499 that is at the end of the second tubular part 414 that is remote from the second longitudinal end 418. The portion of each side wall 474 that is between the second longitudinal end 418 and the step 498 is also taller than the side wall 474 at the insertion end 499.

As shown in FIG. 17, the step 498 in each of the two lateral side walls 474 facilitates installation of the firestop 410 beneath a soffit S. To this end, the first tubular part 412 can be secured in a desired position to the soffit S, using appropriate fasteners extending through the holes 494. The second tubular part 414 can then be inserted into the installed first tubular part 412, as indicated schematically in FIG. 16, with the upper panel 472 clear of the sheet 488 that is on the upper panel 462 of the first tubular part 412. The second tubular part 414 can be secured in a desired position to the soffit S, using appropriate fasteners extending through the holes 496. Further, the second tubular part 414 can be inserted into the first tubular part 412 to establish a length between the first and second longitudinal ends 416, 418 that is between the maximum and minimum lengths.

In this example, each of the lower panel 466 and lower panel 476 is a separately formed panel that is secured respectively to the two lateral side walls 464 or the two lateral side walls 474 to thereby form a tubular structure. To this end, permanent fasteners are used to form the connections.

Further, in this example, the mounting flanges 490, 492 are configured to secure the firestop 410 at locations that are longitudinally outside the passageway 420. In some alternative example, the mounting flanges can project transversely from the two lateral side walls 464 and the two lateral side walls 474. Further, in these examples the mounting flanges can be arranged to secure the tubular parts 412, 414 to either the soffit, or to a wall structure.

In the examples described in reference to the drawings, the first and second tubular parts have a structure that is inseparable in the circumferential direction around the respective passageway. In some other examples, the first and/or second tubular parts can be formed of two or more separable parts that are assemblable into the respective tubular part.

Further, in the examples described in reference to the drawings, the first and second tubular parts are physically separate components. However, the housing may be a single component. To this end, the first and second tubular parts may be end parts of the housing, and the housing may include a flexible joining part that interconnects the first and second tubular parts. Alternatively, the first and second tubular parts can be integrally formed together with a flexible joining part.

For the purposes of this specification, where intumescent material is described and/or claimed as a "sheet", the term "sheet" is to include material that is known within the art as an "intumescent strip", and material that is assembled from multiple individual layers.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A firestop for one or more service components, the firestop comprising:
   a housing having:
      a first tubular part that defines a first longitudinal end of the housing, the first tubular part having a first inner end portion at an opposing end of the first tubular part to the first longitudinal end,
      a second tubular part that defines a second longitudinal end of the housing, the second tubular part having a second inner end portion at an opposing end of the second tubular part to the second longitudinal end, and
      a passageway that extends between the first and second longitudinal ends, and that is defined by at least the first and second tubular parts, whereby when the firestop is installed in a building, the service components are to extend through the passageway,
   a mating interconnection between the first and second tubular parts that permits the length of the housing between the first and second longitudinal ends to be adjustable between a maximum length and a minimum length, the mating interconnection being configured such that the second inner end portion is shaped to be received within the first inner end portion, wherein a part of the second inner end portion that is internally of the first inner end portion increases as the length of the housing between the first and second longitudinal ends decreases; and
   intumescent material that is supported by the housing and that swells in response to heat, the intumescent material being arranged into at least:
      a first portion that is supported by the first tubular part, and is disposed at the first longitudinal end to swell in response to heat in at least an inward direction with respect to the first portion, and
      a second portion that is supported by the second tubular part, and is disposed at the second longitudinal end to swell in response to heat in at least an inward direction with respect to the second portion,
   wherein when the firestop is arranged such that the length of the housing between the first and second longitudinal ends is at the minimum length, the second inner end portion is disposed within a region of the first tubular part that supports the first portion of the intumescent material, without interfering with the capacity of the first portion to swell in response to heat in at least an inward direction with respect to the first portion.

2. A firestop according to claim 1, wherein the mating interconnection is arranged to constrain the relative positions of the first and second tubular parts at each length of the housing.

3. A firestop according to claim 1, wherein the mating interconnection includes:
   one or more guide formations in one part of the housing, and
   one or more follower formations in another part of the housing,
   wherein each follower formation locates in a respective guide formation to thereby constrain the relative positions of the first and second tubular parts at each length of the housing.

4. A firestop according to claim 1, wherein the mating interconnection is arranged to inhibit the first and second tubular parts from relative rotation at each length of the housing.

5. A firestop according to claim 3, wherein the guide formations extend spiroidally with respect to the housing, or extend parallel with the longitudinal direction of the housing.

6. A firestop according to claim 1, wherein the mating interconnection is arranged to inhibit the first and second tubular parts from relative longitudinal displacement at each length of the housing.

7. A firestop according to claim 1, further comprising one or more mounting formations that are associated with the housing, and wherein in installation of the firestop the mounting formation facilitates attaching the firestop to a building with an opening within which the firestop is located.

8. A firestop according to claim 7, wherein the mounting formations include one or more mounting flanges that are connected to the housing, each mounting flange having one or more mounting points for use in mounting the firestop to the building.

9. A firestop according to claim 8, wherein the mounting flanges extend generally parallel with the longitudinal direction of the firestop.

10. A firestop according to claim 8, wherein the mounting flanges project longitudinally outwardly with respect to the passageway.

11. A firestop according to claim 7, wherein the mounting formations are provided at both first and second longitudinal ends of the housing.

12. A firestop according to claim 7, wherein the mounting formation is in the form of an annular ring that is securable about the housing, the annular ring having a radially extending mounting flange.

13. A firestop according to claim 1, further comprising dividers that each extends across one or both of the first and second longitudinal ends.

14. A firestop according to claim 13, wherein each divider is arranged in one or more sets of bristles that project at least partially across the respective longitudinal end, with slits being defined between the individual bristles.

15. A method of forming a barrier with fire-resistance within a building that has an opening in a structure through which one service components are to extend, the method involving:
   providing a firestop according to claim 1,
   adjusting the length of the firestop such that the first and second longitudinal ends of the housing have a separation that is determined relative to the thickness of the structure, and
   installing the firestop within the opening and at a desired position with the first and second longitudinal ends at predetermined positions relative to at least one of the external faces of the structure,
   wherein the service components extend through, or are able to be passed through, the passageway.

16. A method according to claim 15, further involving restraining the firestop at the desired position.

17. A method according to claim 16, wherein restraining the firestop involves securing one or more mounting formations about the housing, such that when firestop is at the desired position each mounting formation abuts the structure and inhibits movement of the firestop through the opening in one direction.

18. A firestop according to claim 1, wherein:
the first tubular part has an upper panel that supports the first portion of intumescent material, two lateral side walls that are each connected to the upper panel, and a lower panel; and
the second tubular part has an upper panel that supports the first portion of intumescent material, two lateral side walls that are each connected to the upper panel, and a lower panel;
wherein each of the two lateral side walls in the second tubular part has a step such that a portion of each side wall that is between the second longitudinal end and the step is taller than a portion of side wall in the second inner end portion, and wherein the upper panel only extends lengthwise between the second longitudinal end and the step.

19. A firestop according to claim 18, further comprising one or more mounting formations in the form of mounting flanges, a first of which is parallel and co-planar with the upper panel of the first tubular part, and a second of which is parallel and co-planar with the upper panel of the second tubular part, and wherein in installation of the firestop the mounting flanges facilitate attaching the firestop to a building and beneath a soffit of the building.

20. A firestop according to claim 18, wherein when the firestop is arranged such that when the length of the housing between the first and second longitudinal ends is at the minimum length, the upper panel of second inner end portion is disposed adjacent the first portion of the intumescent material.

* * * * *